(12) United States Patent
Frisk et al.

(10) Patent No.: US 12,526,637 B2
(45) Date of Patent: *Jan. 13, 2026

(54) SECURITY PROTOCOL FOR PAIRING COLLOCATED USERS

(71) Applicant: Snap Inc., Santa Monica, CA (US)

(72) Inventors: Savanah Frisk, Los Angeles, CA (US); Andrés Monroy-Hernández, Princeton, NJ (US); Quan Thoi Minh Nguyen, Palo Alto, CA (US); Yu Jiang Tham, Los Angeles, CA (US); Michael Jing Xu, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,200

(22) Filed: Jun. 11, 2024

(65) Prior Publication Data

US 2024/0334195 A1  Oct. 3, 2024

Related U.S. Application Data

(63) Continuation of application No. 17/304,205, filed on Jun. 16, 2021, now Pat. No. 12,058,525.

(Continued)

(51) Int. Cl.
*G06F 21/00* (2013.01)
*H04L 67/303* (2022.01)
(Continued)

(52) U.S. Cl.
CPC ........... *H04W 12/50* (2021.01); *H04L 67/303* (2013.01); *H04W 4/023* (2013.01); *H04W 4/80* (2018.02);
(Continued)

(58) Field of Classification Search
None
See application file for complete search history.

(56) References Cited

U.S. PATENT DOCUMENTS 6,427,122 B1  7/2002  Lin
8,402,085 B2  3/2013  Mccanne et al.
(Continued)

FOREIGN PATENT DOCUMENTS

CN  109075966 A  12/2018
CN  116134858    5/2023
(Continued)

OTHER PUBLICATIONS

"European Application Serial No. 21831626.3, Response filed Aug. 3, 2023 to Communication pursuant to Rules 161(2) and 162 EPC mailed Feb. 7, 2023", 13 pgs.

(Continued)

*Primary Examiner* — Maung T Lwin
(74) *Attorney, Agent, or Firm* — Schwegman Lundberg & Woessner, P.A.

(57) ABSTRACT

A system to perform operations that include: detecting, at a first client device, a second client device in proximity with the first client device; generating a pairing code in response to the detecting the second client device in proximity of the first client device; establishing a communication pathway between the first client device and the second client device based on at least the pairing code; and presenting a collocation indicator at the first client device based on the establishing the communication pathway, according to certain example embodiments.

12 Claims, 11 Drawing Sheets

Related U.S. Application Data

(60) Provisional application No. 63/045,742, filed on Jun. 29, 2020.

(51) Int. Cl.

| | | |
|---|---|---|
| *H04W 4/02* | (2018.01) | |
| *H04W 4/80* | (2018.01) | |
| *H04W 12/50* | (2021.01) | |
| *H04W 12/63* | (2021.01) | |
| *H04W 24/08* | (2009.01) | |
| *H04W 76/14* | (2018.01) | |

(52) U.S. Cl.
CPC ........... *H04W 12/63* (2021.01); *H04W 24/08* (2013.01); *H04W 76/14* (2018.02)

(56) References Cited

U.S. PATENT DOCUMENTS

| | | | |
|---|---|---|---|
| 8,537,798 B2 | 9/2013 | Hirsch et al. | |
| 8,813,188 B2* | 8/2014 | Vauclair | H04W 12/50 726/5 |
| 9,198,214 B2* | 11/2015 | Hertel | H04L 63/18 |
| 9,262,915 B2* | 2/2016 | Clem | G08G 1/08 |
| 9,654,960 B2* | 5/2017 | Zhou | H04W 8/005 |
| 9,836,646 B2 | 12/2017 | Larsen et al. | |
| 10,064,052 B2 | 8/2018 | Peluso et al. | |
| 10,362,466 B2 | 7/2019 | Swanzey et al. | |
| 10,397,783 B2* | 8/2019 | Yan | H04W 76/11 |
| 11,391,830 B2 | 7/2022 | Au et al. | |
| 11,540,137 B2* | 12/2022 | Ledvina | H04W 76/14 |
| 2007/0067628 A1* | 3/2007 | Kim | H04L 63/0428 713/168 |
| 2010/0278345 A1* | 11/2010 | Alsina | H04W 12/06 709/227 |
| 2012/0106517 A1 | 5/2012 | Charbit et al. | |
| 2012/0317194 A1* | 12/2012 | Tian | H04W 4/80 709/204 |
| 2013/0169526 A1* | 7/2013 | Gai | G06F 3/03547 345/156 |
| 2014/0204919 A1 | 7/2014 | Chen et al. | |
| 2014/0380419 A1 | 12/2014 | Peluso et al. | |
| 2015/0019280 A1 | 1/2015 | Mejegard et al. | |
| 2015/0099466 A1* | 4/2015 | Narendra | H04W 12/06 455/41.2 |
| 2017/0004475 A1* | 1/2017 | White | G06Q 20/322 |
| 2017/0135151 A1 | 5/2017 | Fujishiro et al. | |
| 2017/0201931 A1 | 7/2017 | Swanzey et al. | |
| 2017/0265241 A1 | 9/2017 | Fujishiro et al. | |
| 2018/0091523 A1 | 3/2018 | Planý | |
| 2018/0101614 A1 | 4/2018 | Kuipers et al. | |
| 2018/0184298 A1* | 6/2018 | Chen | H04W 12/63 |
| 2018/0239932 A1 | 8/2018 | Gummeson et al. | |
| 2018/0338330 A1* | 11/2018 | Ledvina | H04W 12/50 |
| 2019/0132901 A1 | 5/2019 | Cohn et al. | |
| 2019/0191273 A1 | 6/2019 | Hollinger | |
| 2019/0362290 A1* | 11/2019 | Rogynskyy | G06F 16/235 |
| 2021/0409954 A1 | 12/2021 | Frisk et al. | |

FOREIGN PATENT DOCUMENTS

| | | |
|---|---|---|
| KR | 20170037655 | 4/2017 |
| WO | WO-2015048202 A1 | 4/2015 |
| WO | WO-2022005791 A1 | 1/2022 |

OTHER PUBLICATIONS

"International Application Serial No. PCT/US2021/038242, International Preliminary Report on Patentability mailed Jan. 12, 2023", 6 pgs.

"International Application Serial No. PCT/US2021/038242, International Search Report mailed Oct. 5, 2021", 3 pgs.

"International Application Serial No. PCT/US2021/038242, Written Opinion mailed Oct. 5, 2021", 4 pgs.

Srivastava, Animesh, et al., "Step-by-step Detection of Personally Collocated Mobile Devices", In :HotMobile ' 15: Proceedings of the 16th International Workshop on Mobile Computing Systems and Applications, [Online] Retrieved from the Internet: <URL: https://dl.acm.org/doi/10.1145/2699343.2699367>, [Retrieved on Sep. 6, 2021], (Feb. 12, 2015), 93-98.

"Chinese Application Serial No. 202180046524.2, Notification to Make Rectification (210302) mailed Feb. 7, 2023", w English machine translation, 2 pgs.

"U.S. Appl. No. 17/304,205, Non Final Office Action mailed Sep. 22, 2023", 11 pgs.

"U.S. Appl. No. 17/304,205, Response filed Dec. 2, 2023 to Non Final Office Action mailed Sep. 22, 2023", 8 pgs.

"U.S. Appl. No. 17/304,205, Final Office Action mailed Dec. 28, 2023", 13 pgs.

"U.S. Appl. No. 17/304,205, Response filed Feb. 28, 2024 to Final Office Action mailed Dec. 28, 2023", 9 pgs.

"U.S. Appl. No. 17/304,205, Notice of Allowance mailed Mar. 25, 2024", 11 pgs.

"European Application Serial No. 21831626.3, Extended European Search Report mailed Jun. 21, 2024", 6 pgs.

"Korean Application Serial No. 10-2023-7002977, Notice of Preliminary Rejection mailed Oct. 4, 2024", w English translation, 9 pgs.

"European Application Serial No. 21831626.3, Response Filed Jan. 9, 2025 to Extended European Search Report mailed Jun. 21, 2024", 17 pgs.

"Chinese Application Serial No. 202180046524.2, Office Action mailed Jun. 25, 2025", W/ English Translation, 15 pgs.

* cited by examiner

US 12,526,637 B2

SECURITY PROTOCOL FOR PAIRING COLLOCATED USERS

CLAIM OF PRIORITY

This application is a continuation of U.S. patent application Ser. No. 17/304,205, filed Jun. 16, 2021, which application claims the benefit of priority to U.S. Provisional Application Ser. No. 63/045,742, filed Jun. 29, 2020, which are incorporated herein by reference in their entireties.

BACKGROUND

Bluetooth wireless technology provides a manner in which devices may wirelessly communicate with one another. Bluetooth technology uses the free and globally available unlicensed 2.4 GHz radio band, for low-power use, allowing two Bluetooth devices within a range of up to 10 to 100 meters to share data with throughput up to 2.1 Mbps. Each Bluetooth device can simultaneously communicate with many other devices.

Before two Bluetooth enabled devices may communicate, the devices must be paired. Bluetooth pairing occurs when the two Bluetooth enabled devices, unknown to each other, become a trusted pair. To become a trusted pair, the two Bluetooth devices must first complete a specific discovery and authentication process. When a first Bluetooth device recognizes a second Bluetooth device and they complete the specific discovery and authentication process, each device can automatically accept communication between them.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
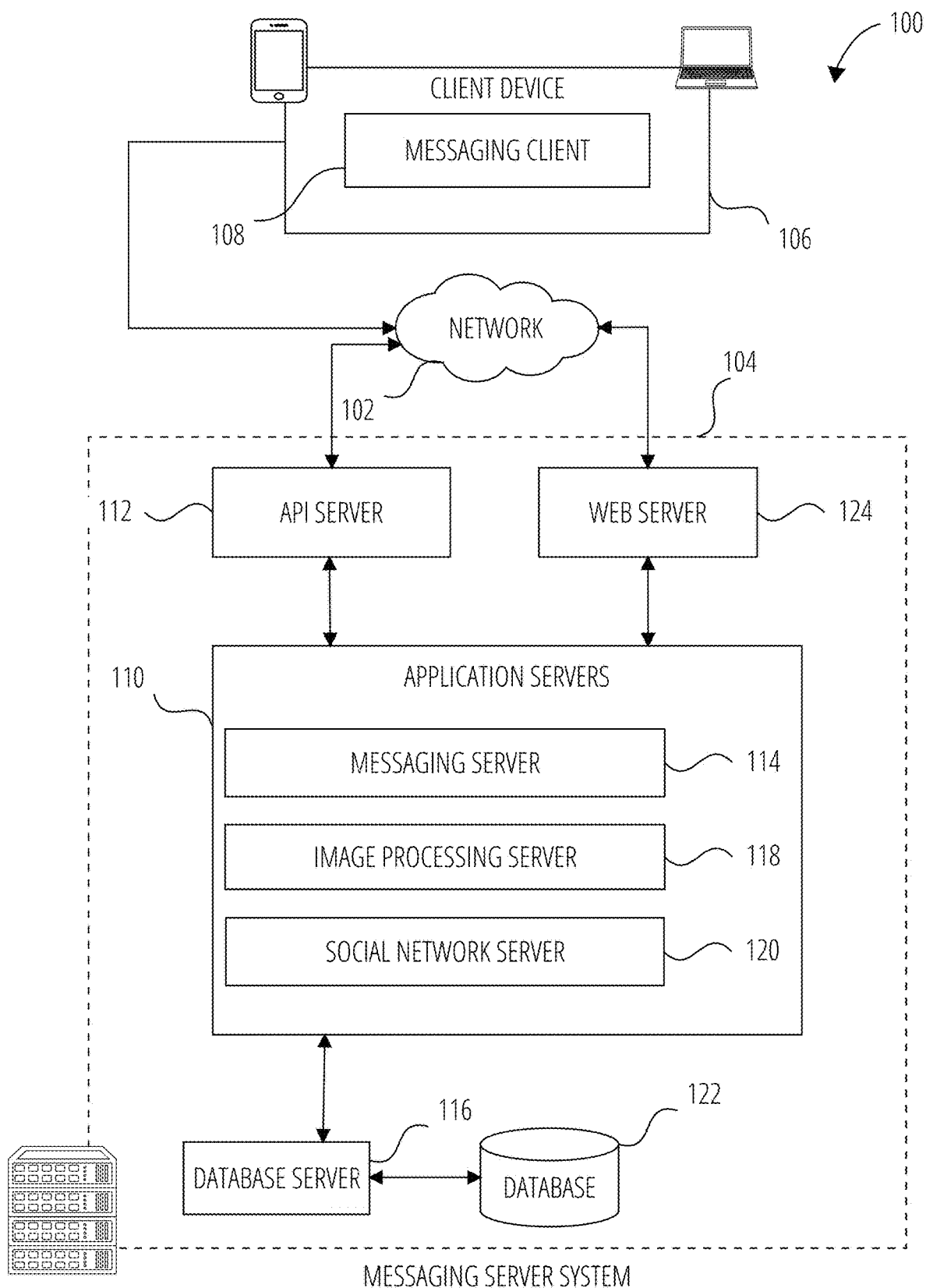
FIG. 1 is a diagrammatic representation of a networked environment in which the present disclosure may be deployed, in accordance with some examples.

The disclosed system provides users with a means for identifying collocated users, and for pairing the devices of the collocated users with one another. In certain embodiments, a system is configured to perform operations that include: detecting, at a first client device, a second client device in proximity with the first client device; generating a pairing code in response to the detecting the second client device in proximity of the first client device; establishing a communication pathway between the first client device and the second client device based on at least the pairing code; and presenting a collocation indicator at the first client device based on the establishing the communication pathway, according to certain example embodiments.

In some example embodiments, the operations to detect a client device in proximity with another client device may include detecting a radio signal generated by a second client device at a first client device. The first client device may determine a signal strength of the radio signal, and perform a comparison of the signal strength of the radio signal against a threshold value, wherein the threshold value may be predefined (i.e., by an administrator of the system), or may be defined based on user preferences. For example, a user of the first client device may provide inputs to define preferences to indicate how nearby a second client device should be before a pairing operation between the first client device and the second client device is performed. Responsive to determining that the signal strength transgresses the threshold value, the system may perform operations to establish a communication pathway between the first client device and the second client device.

In some example embodiments, pairing the first client device with the second client device may include a "Numeric Comparison" pairing method. Pairing the devices provides a secure channel in which data can be exchanged. In certain embodiments, a key to resolve a Universally Unique Identifier (UUID). A UUID is a number used to identify information in computer systems. The system may cause the devices to perform a key exchange, such as an asymmetric key exchange, or a symmetric key exchange.

In an asymmetric key exchange, one of two devices (e.g., a first client device from among a first and a second client device) generates a random 256-but HMAC-SHA256 key which is denoted as UUID_key, and sends it to the second client device over the secure channel. In a symmetric key exchange, each device generates its own random 256-but HMAC key and sends it to the other device over the secure channel.

In some embodiments, generation of the UUID key may be based on a temporal value. For example, the system may generate a time value "T," by denoting the Unix epoch time in seconds as "T," where period p=60×15. The time t=T/p rounded to the nearest integer value. The first 3-bytes of the UUID key may be fixed (000000 or 111111), and the remaining random 13-bytes may be deterministically generated as: HMAC (UUID_key, t) [: 13]. Accordingly, the first 13-bytes of the 32-byte output of HMAC (UUID_key, t) may be used as the remaining 13-bytes of UUID in both central and peripheral modes. To resolve the receiving UUID, some time-skew (drift) may be tolerated by computing HMAC (UUID_key, t−1) or HMAC (UUID_key, t+1) when comparing the computed HMAC and the received HMAC.

To prevent tracking, existing Bluetooth Low Energy (BLE) systems may apply random resolvable mac addresses, wherein the basic idea is to distribute Identity Resolving Key (IRK) after bonding. The random device address is computed as follow: 24-bit hash |22-bit prand|| 10 where hash=AES (IRK, 0-padding+prand) % 2 24 (see volume 3, part C, section 10.8.2 of the Bluetooth 4.2 specification). While such methods provide some benefit, these methods remain vulnerable to replay attacks, and must therefore be avoided for generation of a secure UUID in certain embodiments. Furthermore, randomizing MAC addresses may not be sufficient to prevent tracking, due to inherent issues in BLE. Accordingly, UUID may be randomized as discussed above. In certain embodiments, changes in UUID are synchronized with the change of MAC address.

In some embodiments, responsive to pairing a plurality of client devices (i.e., the first client device and the second client device), the system may generate and cause display of a collocation icon at each of the plurality of client devices. In certain embodiments, the collocation icon may be based on user profile data associated with each of the plurality of devices.

In some embodiments, the system may curate a collection of media content in response to pairing the plurality of devices, wherein the collection of media content may be curated based on user profile data associated with each device among the plurality of client devices. The collection of media content may thereby be presented at each devices among the plurality of devices. In such embodiments, a user of a first client device may provide an input that selects media content from among the collection of media content, and in response, the system may display or otherwise present the media content at each of the paired device(s).

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the Internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

Figure 2:
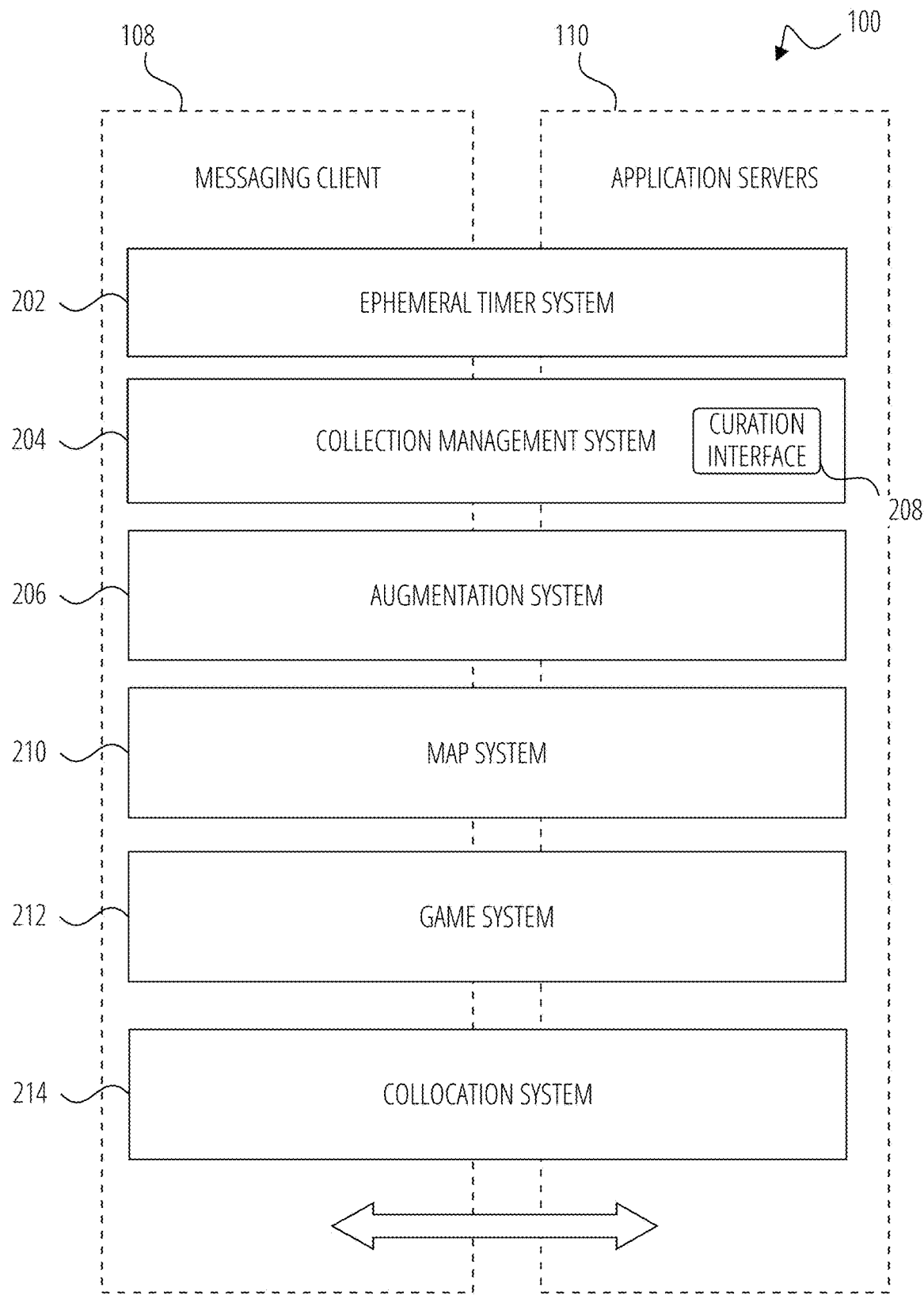
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a collocation system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars (e.g., stored in profile data 316 (deleted)) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The collocation system 214 provides various collocation functions within the context of the messaging clients 108. According to certain embodiments, the collocation system 214 may perform operations to identify client devices within a proximity (i.e., a threshold distance) of a first client device, and responsive to detecting the client devices in the proximity of the first client device, causing the devices to pair with one another, and presenting a collocation icon at each of the paired devices.

Figure 3:
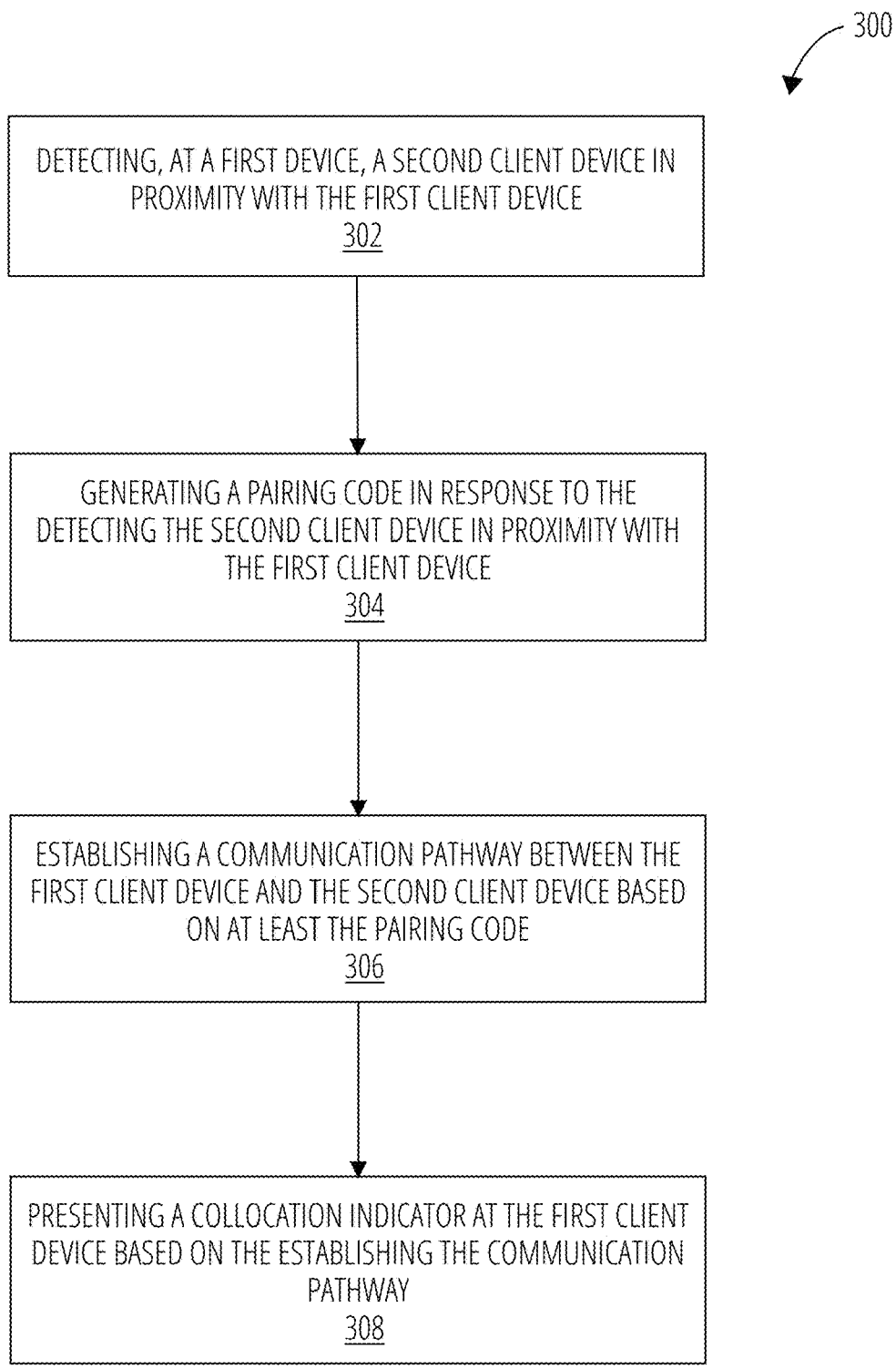
FIG. 3 is a flowchart depicting a method 300 in accordance with one embodiment.

FIG. 3 is a flowchart illustrating operations of a collocation system 214 in performing a method 300 for detecting a second client device in proximity of a first client device, and causing display of a collocation icon at the first client device, according to certain example embodiments. Operations of the method 300 may be performed by one or more subsystems of the messaging system 100 described above with respect to FIG. 2, such as the collocation system 214. As shown in FIG. 3, the method 300 includes one or more operations, 302, 304, 306, and 308.

At operation 302, a first client device 106 detects a second client device 106 within a proximity of the first client device 106. For example, the first client device 106 may detect a signal that corresponds with the second client device 106, such as a BLE signal. While such embodiments may utilize a BLE signal, the system is not limited to such embodiments, and accordingly may detect devices based on other types of wireless or radio signals.

At operation 304, the first client device 106 generates a pairing code in response to detecting the second client device 106 within the proximity of the first client device 106. For example, in some embodiments, the pairing code may be generated based on a numeric comparison pairing method, utilizing a symmetric or asymmetric key exchange protocol, as described in the method 500 depicted in FIG. 5.

For example, in some embodiments, generation of a UUID key may be based on a temporal value, such that a time value "T" may be generated by denoting the Unix epoch time in seconds as "T," where period p=60×15. The time t=T/p rounded to the nearest integer value. As discussed above, in some embodiments the first 3-bytes of the UUID key may be fixed (000000 or 111111), and the remaining random 13-bytes may be deterministically generated as: HMAC (UUID_key, t) [: 13]. The first 13-bytes of the 32-byte output of HMAC (UUID_key, t) may be used as the remaining 13-bytes of UUID in both central and peripheral modes. To resolve the receiving UUID, some time-skew (drift) may be tolerated by computing HMAC (UUID_key, t−1) or HMAC (UUID_key, t+1) when comparing the computed HMAC and the received HMAC.

At operation 306, a communication pathway is established between the first client device 106 and the second client device 106 based on at least the pairing code. In some embodiments, the communication pathway may include a device pairing, such as a BLE pairing.

Figure 7:
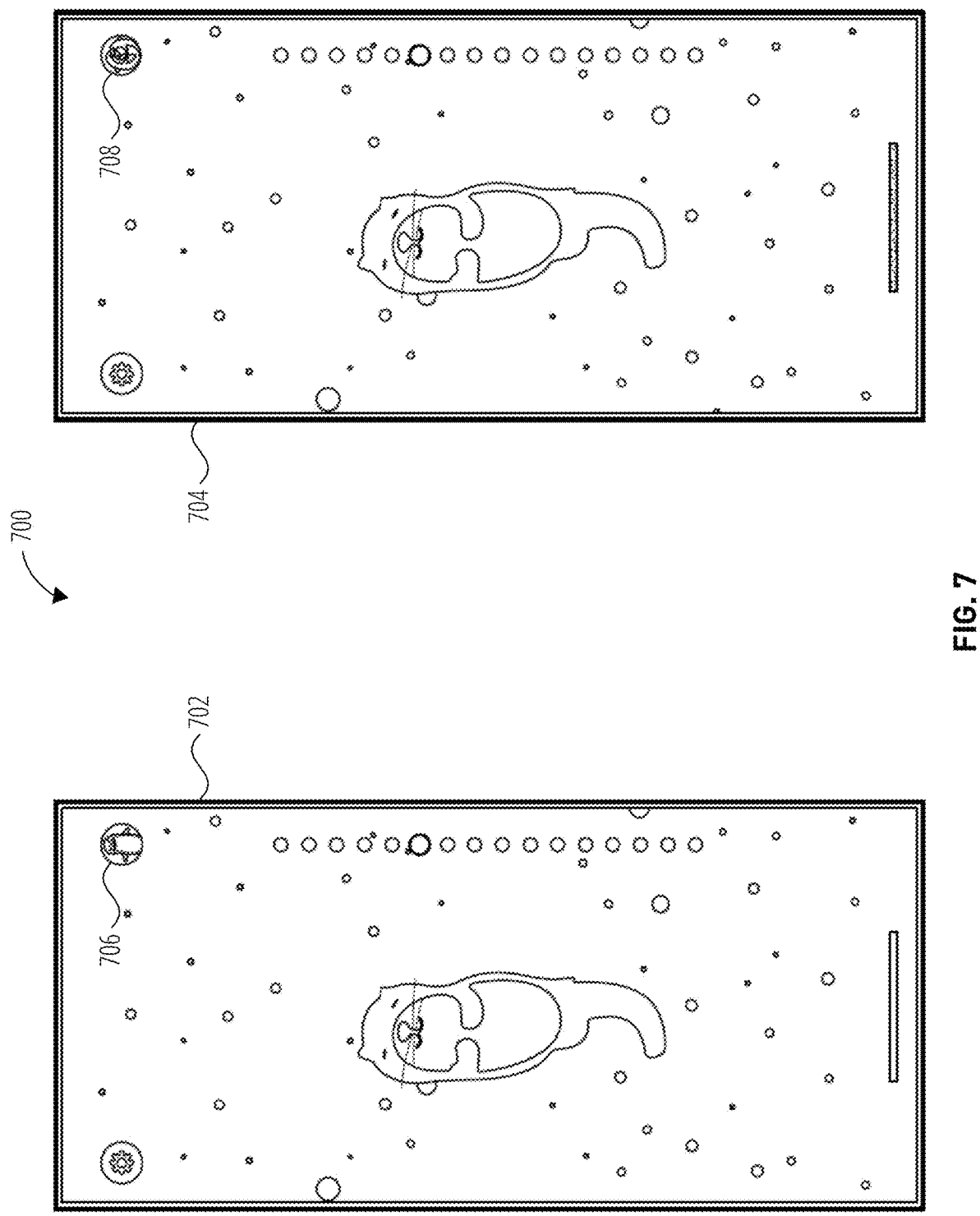
FIG. 7 illustrates an interface flow diagram 700 in accordance with one embodiment.

At operation 308, a collocation indicator is presented at the first client device 106, and as depicted in the interface flow diagram 700 of FIG. 7.

Figure 4:
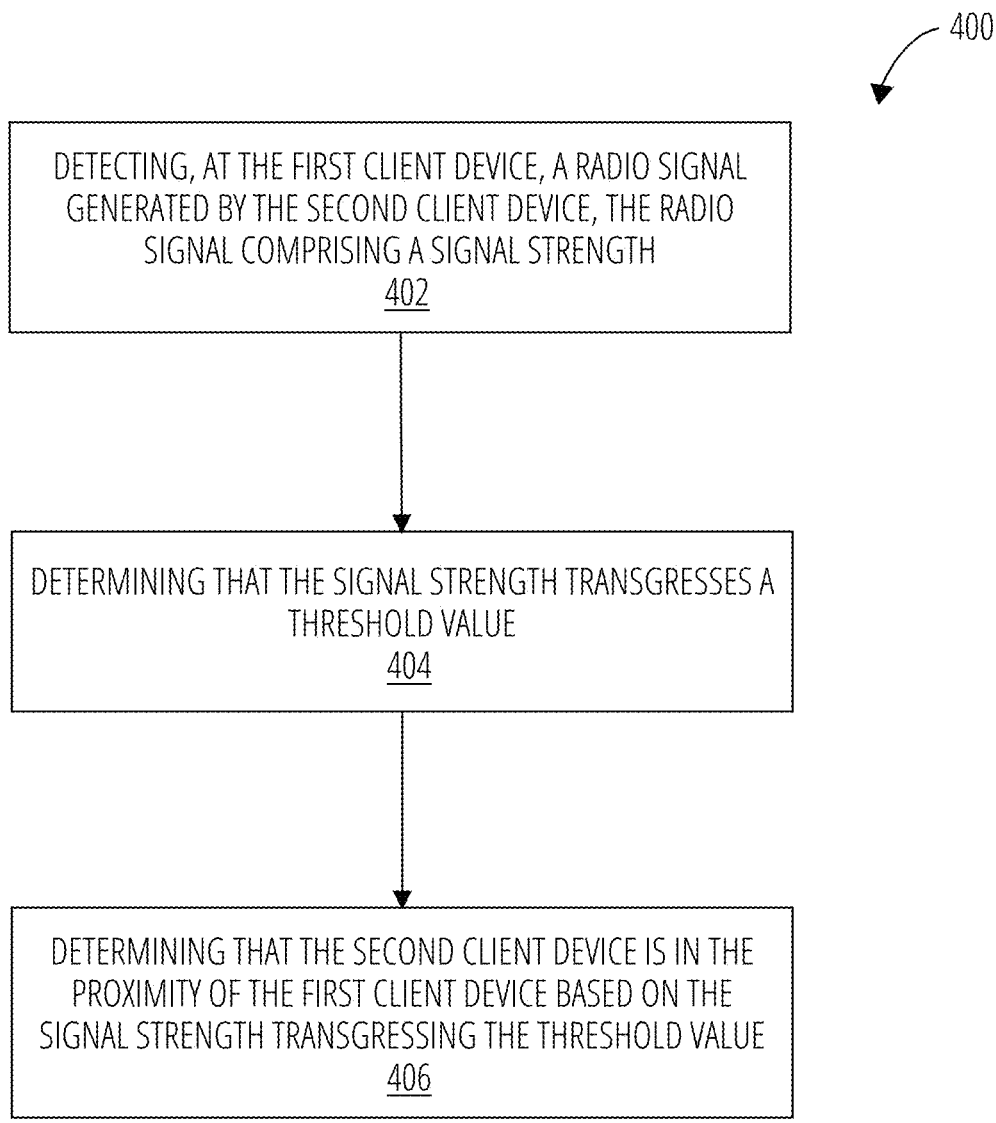
FIG. 4 illustrates a method 400 in accordance with one embodiment.

FIG. 4 is a flowchart illustrating operation of a collocation system 214 in performing a method 400 for detecting a second client device 106 in proximity of a first client device client device 106, according to certain example embodiments. Operations of the method 400 may be performed by one or more subsystems of the messaging system 100 described above with respect to FIG. 2, such as the collocation system 214. As shown in FIG. 4, the method 400 includes one or more operations 402, 404, and 406 which may be performed as a subroutine of the method 300.

At operation 402, the first client device 106 detects a radio signal generated by the second client device 106, wherein the radio signal comprises a signal strength. For example, in some embodiments, responsive to detecting the radio signal generated by the second client device 106, the first client device 106 may determine a signal strength of the radio signal, and perform a comparison of the signal strength of the radio signal against a threshold value.

In some embodiments, the threshold value may be predefined (i.e., by an administrator of the system), or may be defined based on user preferences. For example, a user of the first client device may provide inputs to define preferences to indicate how nearby a client device should be before a pairing operation is performed. Accordingly, at operation 404, responsive to determining that the signal strength of the signal generated by the second client device 106 transgresses the threshold value, the system proceeds to operation 406, wherein the first client device 106 determines that the second client device 106 is within a proximity based on the signal strength transgressing the threshold value, and operations to establish a communicative connection between the devices may be performed, as depicted in the method 500 of FIG. 5.

Figure 5:
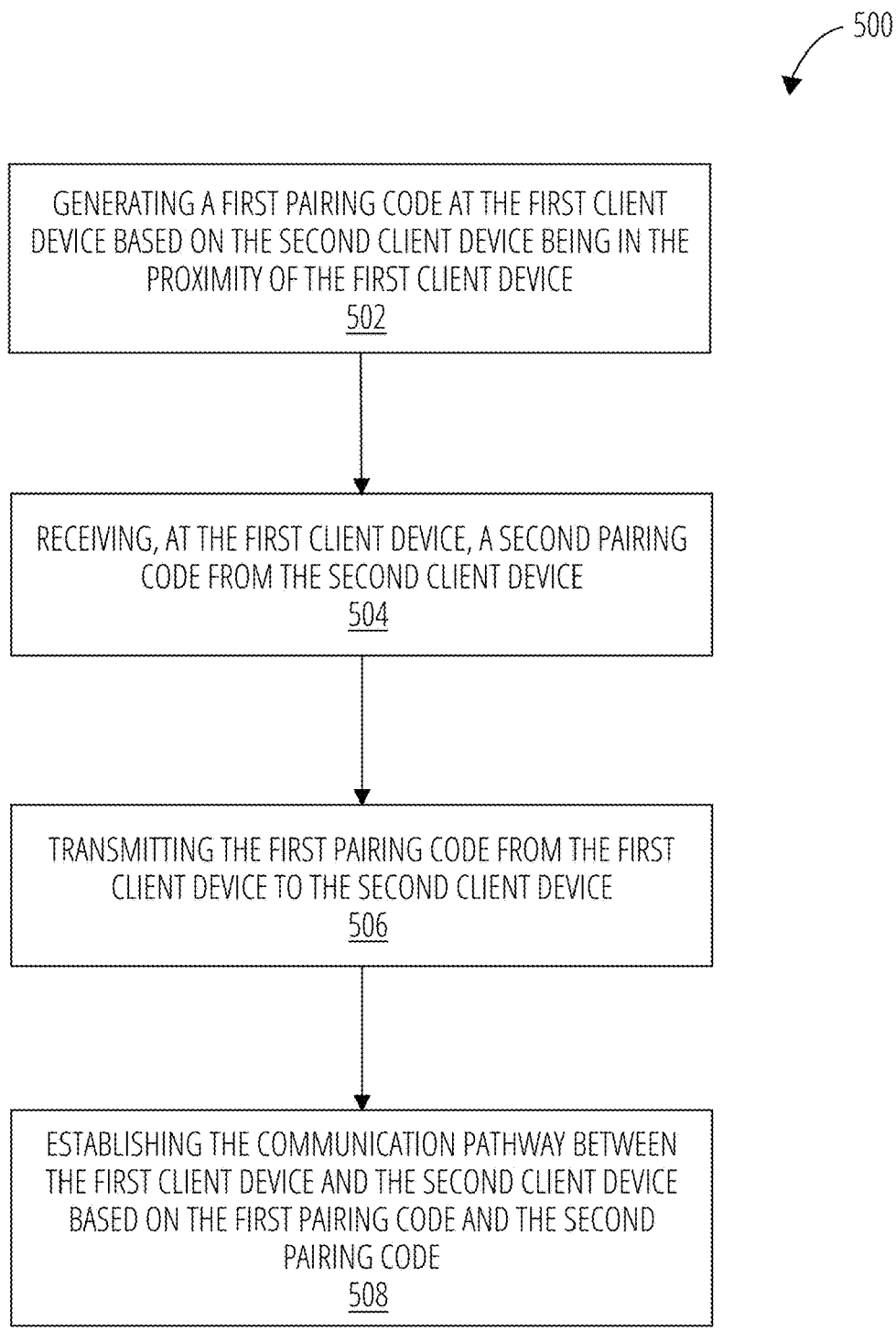
FIG. 5 illustrates a method 500 in accordance with one embodiment.

FIG. 5 is a flowchart illustrating operations of a collocation system 214 in performing a method 500 for establishing a secure communication pathway between a first client device 106 and a second client device 106, according to certain example embodiments. Operations of the method 500 may be performed by one or more subsystems of the messaging system 100 described above with respect to FIG. 2, such as the collocation system 214. As shown in FIG. 5, the method 500 includes one or more operations 502, 504, 506, and 508, that may be performed as a subroutine of the method 300.

At operation 502, the first client device 106 generates a first pairing code in response to determining that the second client device 106 is within a proximity of the first client device 106. For example, responsive to performing the method 400 depicted in FIG. 4, various modules of the collocation system 214 may perform a numeric comparison pairing method that includes a symmetric or asymmetric key exchange protocol.

For example, in an asymmetric key exchange, the first client device 106 generates a random 256-bit HMAC-SHA256 key which is denoted as UUID_key, and sends it to the second client device 106 over a secure channel. Similar, in a symmetric key exchange, each device generates its own random 256-bit HMAC key and sends it to the other device over the secure channel.

In some embodiments, as discussed above, generation of a random UUID key may be accomplished based on use of a temporal value, wherein a time value "T" is generated by denoting the Unix epoch time in seconds as "T," where period p=60×15. The time t=T/p rounded to the nearest integer value, and the first 3-bytes of the UUID key may be fixed (000000 or 111111), while the remaining random 13-bytes may be deterministically generated as: HMAC (UUID_key, t) [: 13]. The first 13-bytes of the 32-byte output of HMAC (UUID_key, t) may be used as the remaining 13-bytes of UUID in both central and peripheral modes.

At operation 504, the first client device 106 receives a second pairing code from the second client device 102, wherein the second pairing code may be generated by a same or similar process as described above in operation 502.

At operation 506, the first client device 106 transmits the first paring code to the second client device 106. In some embodiments, the first client device 106 may transmit the first pairing code responsive to receiving the second pairing code.

At operation 508, the collocation system 214 establishes the communication pathway between the first client device 106 and the second client device 106 based on the first pairing code and the second pairing code. In some embodiments, the communication pathway may include a BLE pairing.

Figure 6:
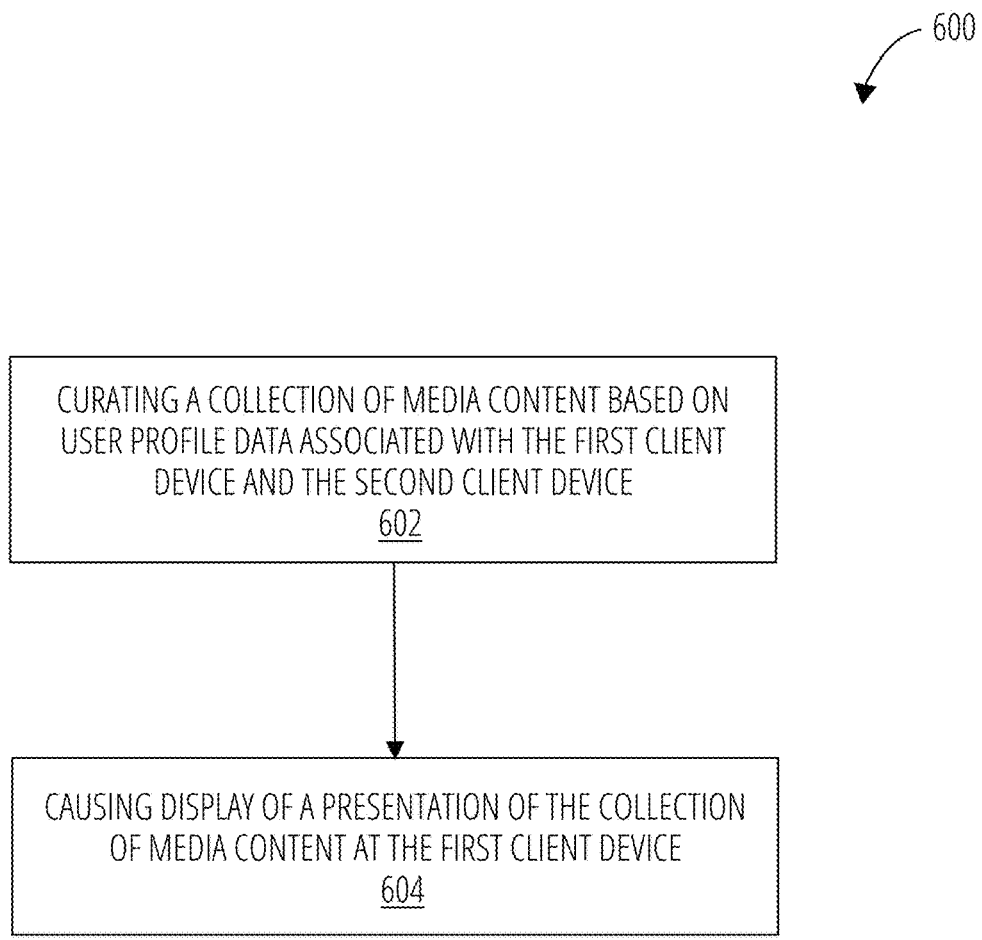
FIG. 6 illustrates a method 600 in accordance with one embodiment.

FIG. 6 is a flowchart illustrating operations of a collocation system 214 in performing a method 600 for curating a collection of media content, according to certain example embodiments. Operations of the method 600 may be performed by one or more subsystems of the messaging system 100 described above with respect to FIG. 2, such as the collocation system 214. As shown in FIG. 6, the method 600 includes one or more operations 602 and 604, which may be performed as a precursor to the method 300.

At operation 602, one or more subsystems of the messaging system 100 curate a collection of media content based on the user profile data associated with the first client device 106 and the second client device 106.

At operation 604, the collection of media content is displayed at the first client device and the second client device. According to certain embodiments a selection of media content from among the collection of media content by either the first client device 106 or the second client device 106 may cause the collocation system 214 to presented the selected media content at both the first client device 106 and the second client device 106.

FIG. 7 is an interface flow diagram 700 depicting various graphical user interfaces (GUI) presented by the collocation system 214 at a client device, such as a first client device 106. As seen in FIG. 7, the interface flow diagram 700 includes an interface 702 that represents an initial, or un-paired state of a device, and an interface 704 that represents a subsequent, or paired state of a device.

As seen in the interface 702, a status indicator 706 is presented at a position within the interface 702, wherein the status indicator 706 provides an indication that a device that corresponds with the interface 702 is in an un-paired state. Accordingly, responsive to detecting a second client device in proximity with the first client device 106, and upon performing a method to establish a secure communication pathway between the first client device 106 and the second client device 106, the collocation system 214 may present the collocation indicator 708 as depicted in the interface 704.

Figure 8:
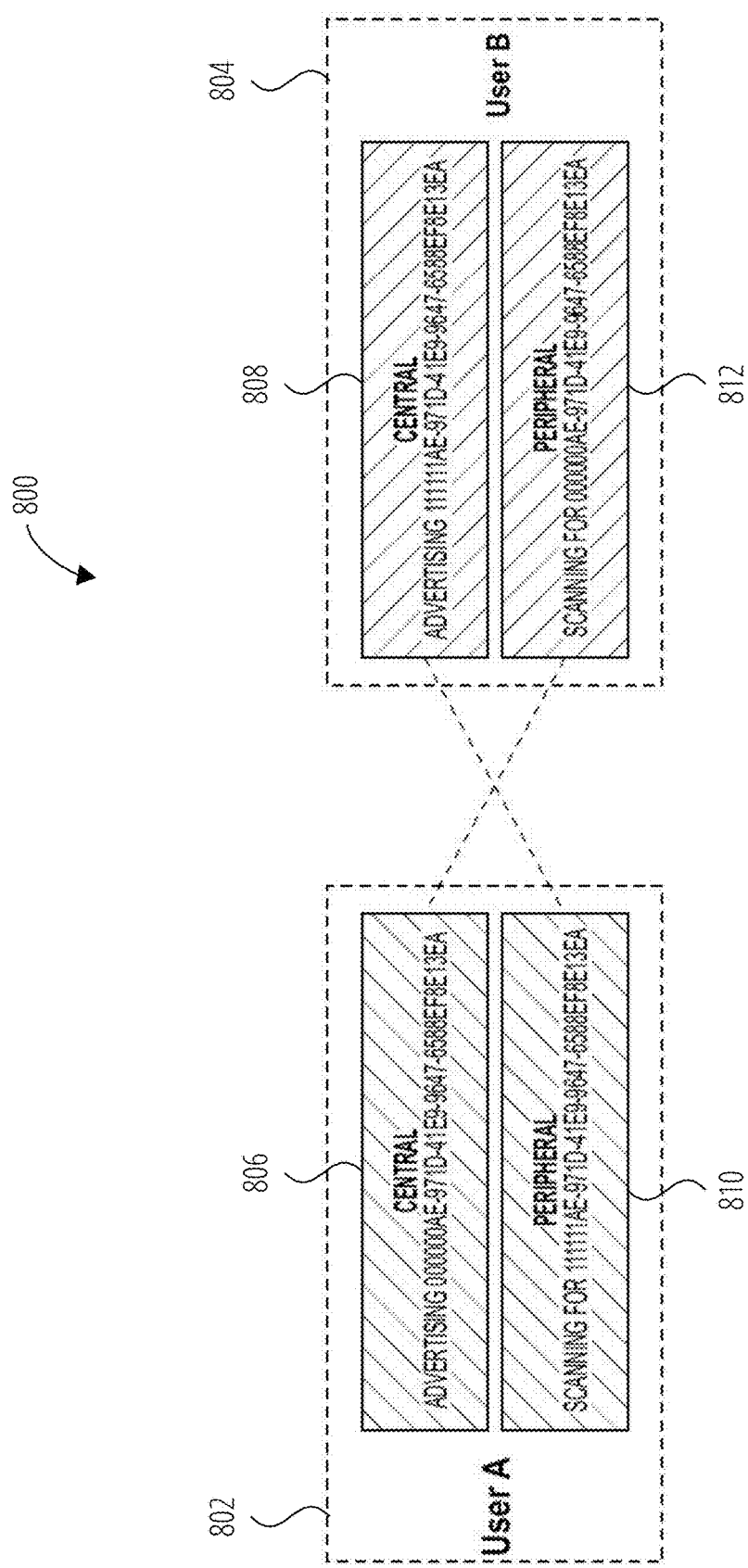
FIG. 8 is a diagram 800 in accordance with one embodiment.

FIG. 8 is a diagram 800 depicting a process of exchanging keys, as performed by the collocation system 214. The diagram 800 includes a first node 802 that represents a first client device 106, and a second node 804 that represents a second client device 106.

As seen in the diagram 800, and as described in the method 500 of FIG. 5, a set of keys (i.e., pairing codes) may be generated at the first node 802 and the second node 804 responsive to detecting a second client device 106 (i.e., the second node 804) in proximity with a first client device 106 (i.e., the first node 802). For example, the first client device 106 may generate the pairing code 806 responsive to detecting a second client device 106 (i.e., the second node 804) in proximity with the first client device 106. Similarly, the second client device 106 may generate the pairing code 804 responsive to detecting the first client device 106 in proximity with the second client device 106. As described in the method 500, the generated keys may be exchanged between the first node 802 and the second node 804.

Machine Architecture

Figure 9:
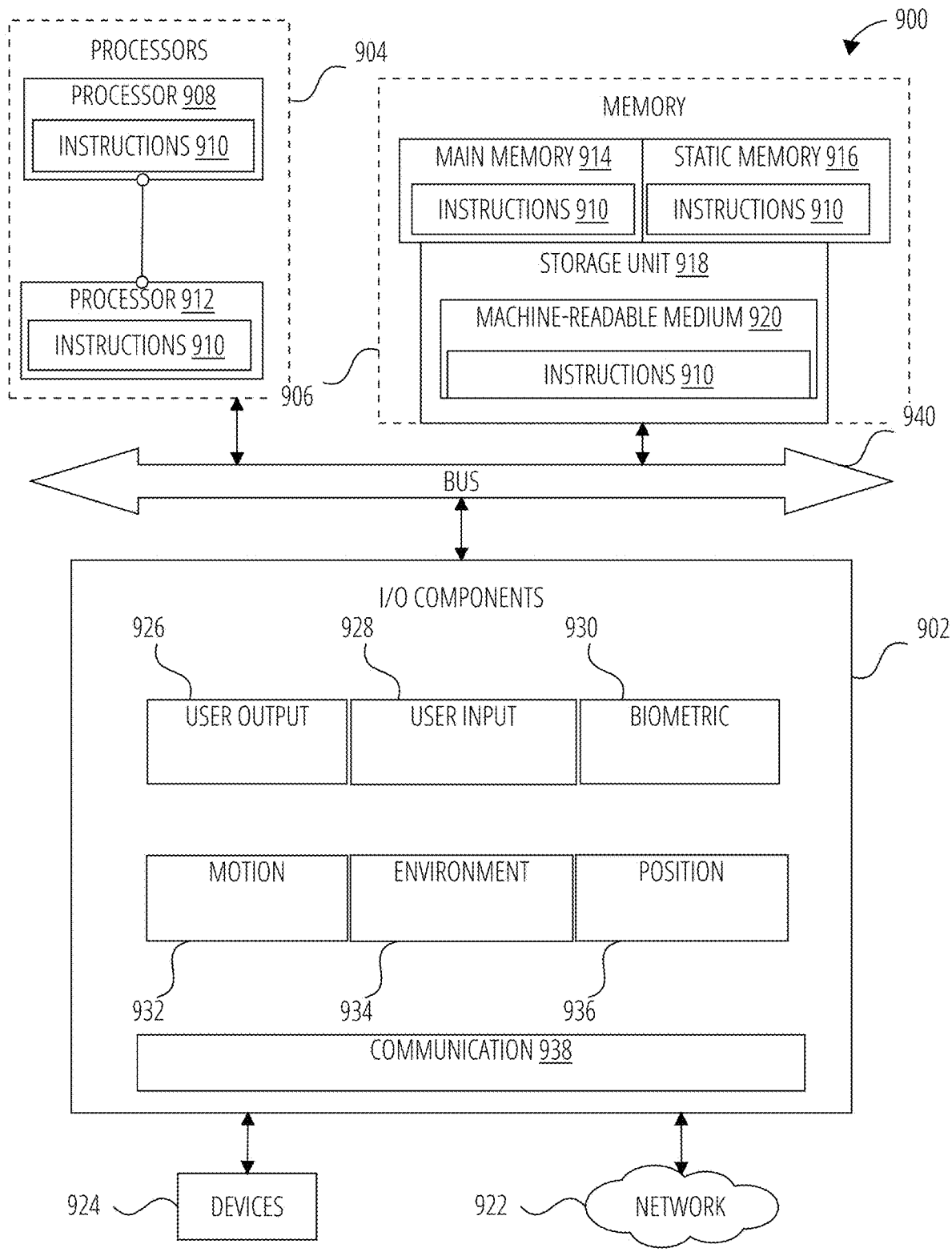
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the client device 106 or any one of a number of server devices forming part of the messaging server system 104. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 638, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the Processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface Component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Software Architecture

Figure 10:
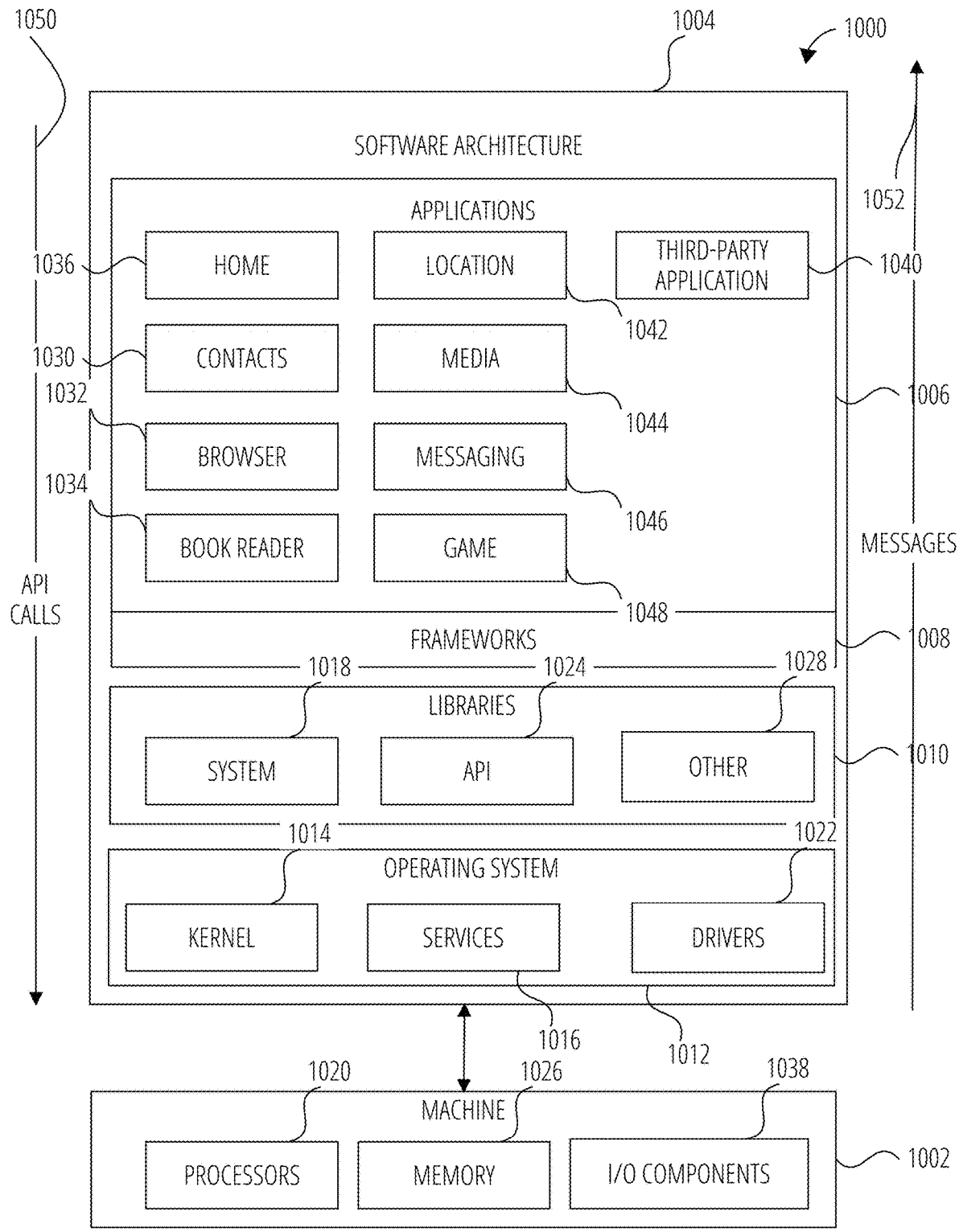
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Processing Components

Figure 11:
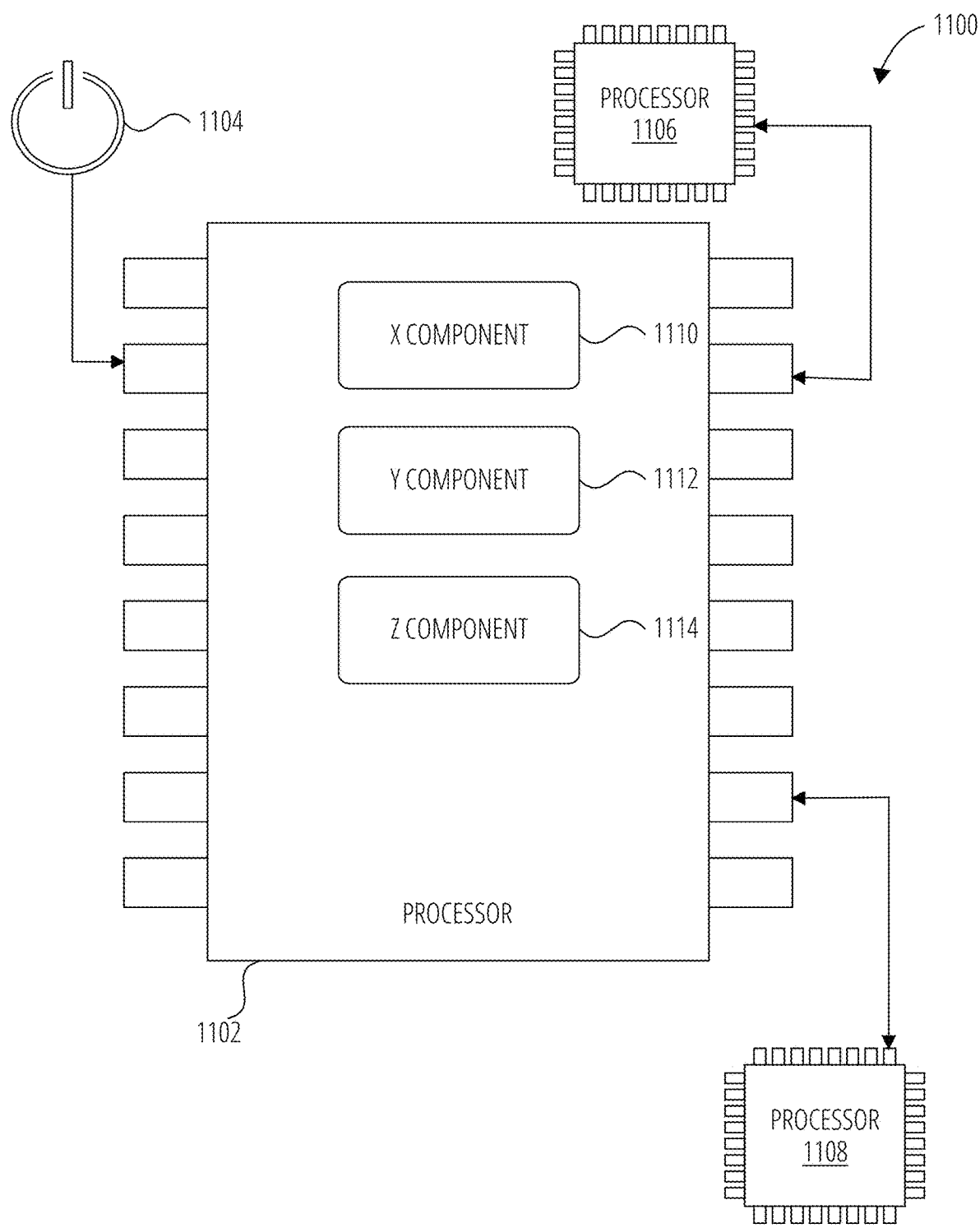
FIG. 11 is a diagrammatic representation of a processing environment, in accordance with some examples.

Turning now to FIG. 11, there is shown a diagrammatic representation of a processing environment 1100, which includes a processor 1102, a processor 1106, and a processor 1108 (e.g., a GPU, CPU or combination thereof).

The processor 1102 is shown to be coupled to a power source 1104, and to include (either permanently configured or temporarily instantiated) modules, namely an X component 1110, a Y component 1112, and a Z component 1114. The X component 1110 operationally generates keys (i.e., UUID keys), the Y component 1112 operationally establishes a communication pathway between devices based on the generated keys, and the Z component 1114 operationally generates media content. As illustrated, the processor 1102 is communicatively coupled to both the processor 1106 and the processor 1108.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smart-phones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   detecting, at a first client device, a second client device within a threshold distance of the first client device, the threshold distance based on a user preference defined based on an input received at the first client device;
   generating a first pairing code in response to the detecting the second client device within the threshold distance of the first client device;
   receiving a second paring code at the first client device, from the second client device;
   transmitting the first pairing code to the second client device;
   establishing a communication pathway between the first client device and the second client device based on an exchange of the first pairing code and the second pairing code; and
   curating a collection of media content in response to establishing the communication pathway between the first client device and the second client device, the collection of media content being curated based on user profile data associated with the first client device and the second client device.

2. The method of claim 1, wherein the detecting the second client device within the threshold distance of the first client device includes:
   detecting a radio signal generated by the second client device at the first client device, the radio signal comprising a signal strength; and
   determining that the signal strength transgresses a threshold value that corresponds with the threshold distance.

3. The method of claim 1, wherein the generating the pairing code includes:
   generating a first pairing code at the first client device; and
   causing the second client device to generate a second pairing code.

4. The method of claim 3, wherein the establishing the communication pathway between the first client device and the second client device includes:
   receiving the second pairing code at the first client device; and
   transmitting the first pairing code from the first client device to the second client device.

5. A system comprising:
   a memory; and
   at least one hardware processor coupled to the memory and comprising instructions that causes the system to perform operations comprising:
   detecting, at a first client device, a second client device within a threshold distance of the first client device, the threshold distance based on a user preference defined based on an input received at the first client device;
   generating a first pairing code in response to the detecting the second client device within the threshold distance of the first client device;
   receiving a second paring code at the first client device, from the second client device;
   transmitting the first pairing code to the second client device;
   establishing a communication pathway between the first client device and the second client device based on an exchange of the first pairing code and the second pairing code; and
   curating a collection of media content in response to establishing the communication pathway between the first client device and the second client device, the collection of media content being curated based on user profile data associated with the first client device and the second client device.

6. The system of claim 5, wherein the detecting the second client device within the threshold distance of the first client device includes:
   detecting a radio signal generated by the second client device at the first client device, the radio signal comprising a signal strength; and
   determining that the signal strength transgresses a threshold value that corresponds with the threshold distance.

7. The system of claim 5, wherein the generating the pairing code includes:
   generating a first pairing code at the first client device; and
   causing the second client device to generate a second pairing code.

8. The system of claim 7, wherein the establishing the communication pathway between the first client device and the second client device includes:
   receiving the second pairing code at the first client device; and
   transmitting the first pairing code from the first client device to the second client device.

9. A non-transitory machine-readable storage medium storing instructions that, when executed by one or more processors of a machine, cause the machine to perform operations comprising:
   detecting, at a first client device, a second client device within a threshold distance of the first client device, the threshold distance based on a user preference defined based on an input received at the first client device;
   generating a first pairing code in response to the detecting the second client device within the threshold distance of the first client device;
   receiving a second paring code at the first client device, from the second client device;
   transmitting the first pairing code to the second client device;
   establishing a communication pathway between the first client device and the second client device based on an exchange of the first pairing code and the second pairing code; and
   curating a collection of media content in response to establishing the communication pathway between the first client device and the second client device, the collection of media content being curated based on user profile data associated with the first client device and the second client device.

10. The non-transitory machine-readable storage medium of claim 9, wherein the detecting the second client device within the threshold distance of the first client device includes:
    detecting a radio signal generated by the second client device at the first client device, the radio signal comprising a signal strength; and
    determining that the signal strength transgresses a threshold value that corresponds with the threshold distance.

11. The non-transitory machine-readable storage medium of claim 9, wherein the generating the pairing code includes:
    generating a first pairing code at the first client device; and
    causing the second client device to generate a second pairing code.

12. The non-transitory machine-readable storage medium of claim 11, wherein the establishing the communication pathway between the first client device and the second client device includes:
    receiving the second pairing code at the first client device; and
    transmitting the first pairing code from the first client device to the second client device.

* * * * *